Nov. 29, 1932.  C. R. HUBBARD ET AL  1,889,144
GASKET
Filed July 25, 1930
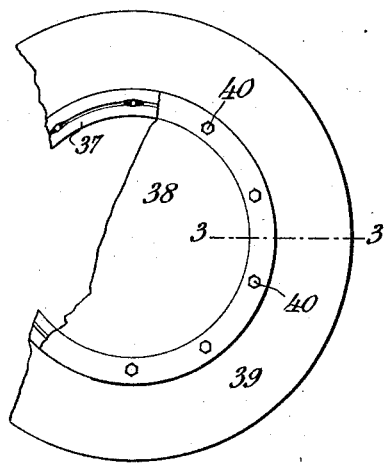
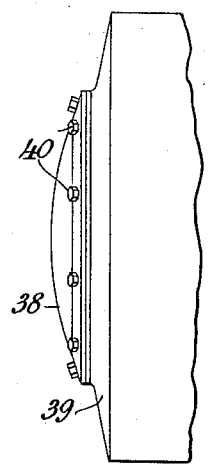
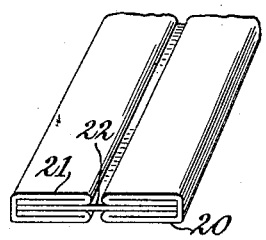
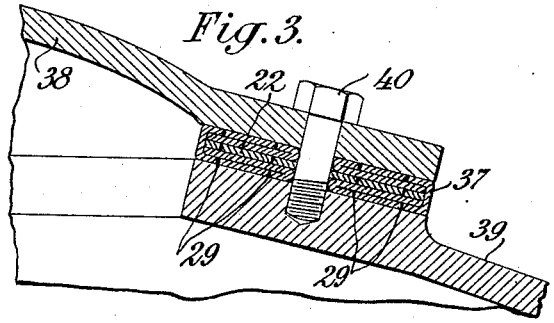
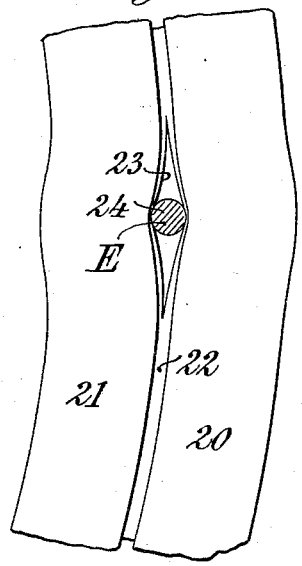
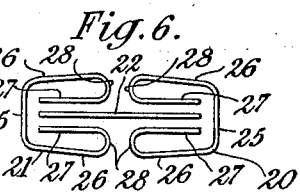
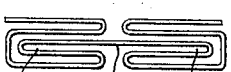
INVENTORS:
Cecil R. Hubbard
and Robert M. Waples,
By Attorneys,
Fraser, Myers & Manley.

Patented Nov. 29, 1932

1,889,144

UNITED STATES PATENT OFFICE

CECIL R. HUBBARD AND ROBERT M. WAPLES, OF PALMYRA, NEW YORK, ASSIGNORS TO THE GARLOCK PACKING COMPANY, OF PALMYRA, NEW YORK, A CORPORATION OF NEW YORK

GASKET

Application filed July 25, 1930. Serial No. 470,565.

This invention relates to an improved packing material especially adapted for use in the making of gaskets. Although of general application, it is peculiarly well fitted to be employed as a gasket to seal the joint around the smoke-box of a locomotive engine.

It is an object of the invention to provide a strip of gasket material of which the packing element need not be pierced by the fastening elements which unite the parts to be sealed by the gasket.

It is a further object to provide a gasket of the above-described character comprising a plurality of sealing elements disposed in a side-by-side relationship and connected by a web, membrane or layer of fabric, paper or other suitable material, of a thickness and texture such that it may be readily slit, perforated, or separated at any desired points between the packing elements to provide for the insertion of the fastening elements.

In the accompanying drawing illustrating the preferred and modified forms of the invention—

Figure 1 represents, in face view, a portion of a locomotive smoke-box with the improved gasket applied, a portion of the cover-plate being removed to disclose underlying structure.

Fig. 2 is a side view of the smoke-box illustrated by Fig. 1.

Fig. 3 is a sectional view through the joint of the smoke-box illustrated in Fig. 1, drawn to a larger scale, the plane of section being represented by the line 3—3 of Fig. 1.

Fig. 4 is a perspective view of a short length of gasket material made in accordance with the invention.

Fig. 5 is a face view of a specimen of the gasket material illustrated by Fig. 4, the specimen being represented as having been slit along the center to provide for the insertion of a fastening element indicated in cross-section.

Fig. 6 is a cross-sectional view of three strips of material bent to appropriate form to be flattened and secured together in the making of a specimen of the improved gasket material.

Figs. 7 to 11, inclusive, are cross-sectional views of five modified forms of gasket material embodying the invention.

Referring first to Figs. 4, 5 and 6, the invention may comprise a pair of packing elements 20, 21, secured together in a side-by-side relationship by means of a connecting strip 22. These parts may be prepared and secured together in any appropriate manner to produce a sealing element which, as indicated in Fig. 5, may be slit through the connecting strip at any desired point, as at 23, to provide for the insertion of a bolt, screw, or other fastening element 24, thus making it unnecessary to perforate or otherwise cut into the strips of packing 20, 21, relied upon as sealing elements, and making it possible to provide the openings for the fastening elements in accordance with the spacing of the fastening devices at the time when the gasket is to be used.

One satisfactory manner of building up and assembling the various parts of the gasket is illustrated by Fig. 6, in which the packing elements 20, 21 are represented as comprising bands of suitable material folded along their centers, as at 25, to provide inwardly-directed surface portions 26, and having their marginal portions 27 turned in so as to provide two pairs of folds 28 facing each other along the center zone of the gasket strip.

The connecting strip 22 may be of paper, gauze, net, or any other material of sufficient strength to hold the two packing elements 20, 21 in their proper relative positions until the gasket is put in use. It should be of a material such as may be readily slit, as indicated in Fig. 5, or otherwise perforated or parted to provide for the insertion of the fastening elements, and it should be such as to permit the packing elements 20, 21 to be forced apart, if necessary, by means of a reamer or other suitable tool, so as to spread them sufficiently to enable the fastening elements to be passed between the inner edges of the packing elements without mutilating them. A relatively light-weight cotton tape has been found to give satisfactory results when used as a connecting strip.

The packing elements 20, 21 may be made of rubber composition, or of fabric, or of fabric saturated or coated with rubber composition, or of any other suitable packing material. Preferably these strips will comprise asbestos fabric saturated or coated with rubber cement or rubber composition.

The parts 20, 21 and 22 may be secured together by the use of rubber cement or rubber composition, which may be subsequently vulcanized, and, if desired, they may be further secured by stitching.

In the form of the invention represented in cross-section in Fig. 3 the folds of the packing elements are secured together and to the connecting strip by two lines of stitching 29 through each of the packing elements. In the form of gasket illustrated in Fig. 7 the parts are secured together by means of a single line of stitching 30 located just within each of the margins of the packing elements 20, 21, the distance from the margin being sufficient to cause the stitching to pass through the four layers of packing material and through the layer of connecting material. In the form of packing illustrated in Fig. 8 the folded margins of the packing elements 20, 21 are represented as being stitched together as at 31, but the stitching of this form does not pass through the connecting element 22.

In Fig. 9 is disclosed a modified form of gasket in which each of the packing elements 20', 21' comprises a ribbon of material folded once at its center and having its edge portions 28' exposed along the center zone of the gasket.

By varying the number of folds of the packing strips, sealing elements of any desired thickness may be built up irrespective of the thickness of the material from which they are made.

In Fig. 10 the invention is illustrated as applied to a gasket adapted for the sealing of relatively wide joints and in which provision is made for the use of two rows of fastening elements located at opposite sides of the center of the gasket. This gasket material comprises three packing elements 32, 33, 34 and two connecting strips 35, 36.

If the material of which the packing elements are made is not too heavy, the packing elements 20", 21" and the connecting strip 22" may comprise a single folded strip of fabric, as indicated in Fig. 11.

It will be understood that any of the various forms of packing represented in Figs. 3, 4 and 7 to 11, inclusive, may have their parts secured together either by the use of rubber cement alone, or by stitching alone, or by incorporating rubber composition with the fabric material and then vulcanizing, or by the use of stitching in addition to the use of rubber cement or rubber composition.

The above-described gasket material may be cut into strips of suitable length and formed into rings of any desired size for use as gaskets for hand-hole plates, manhole plates, pipe joints, or other analogous devices having joints to be sealed. As indicated in Figs. 1, 2 and 3, the material is illustrated as being used to seal the joint at the periphery of the cover of a locomotive smoke-box. In this application of the gasket material the gasket ring 37 is clamped between the margin of the cover 38 and the front wall 39 of the smoke-box. When the ring is ready for application to the joint, the slits 23 (Fig. 5) may be made in accordance with the approximate spacing of the machine screws 40 by which the cover is applied to the opening in the smoke-box. If necessary, the sealing elements 20, 21 of the packing may be slightly spread apart by the insertion of a reamer or other suitable instrument, after which the screws may be inserted in the cover and thrust through the slitted portions of the gasket ring, which may then be secured in place by tightly drawing up the screws in threaded openings provided therefor in the part of the smoke-box surrounding the opening to be closed by the cover.

The use of layers of packing material in side-by-side arrangement connected by means of a relatively thin strip or web which may be readily slit or separated at any point to provide for the insertion of the fastening elements avoids all necessity for any careful spacing of openings for the fastening elements and the annoyance which results when such spacing of the openings does not conform with the spacing of the fastening elements.

The invention is not intended to be limited to the forms herein disclosed for purposes of illustration, but should be regarded as including modifications and variations thereof within the scope of the appended claims.

What is claimed is:

1. A gasket comprising packing elements of folded fibrous material disposed in side-by-side relationship and intervening connecting material having portions extended between the folds of the packing elements, the connecting material being of a nature such as to permit fastening elements to be readily passed between the packing elements at any desired points.

2. A gasket, as defined by claim 1, of which the packing strips comprise ribbons of fibrous material folded along their centers and having their margins folded in, the folded margins of the two strips being adjacent, and of which the connecting medium comprises a ribbon having its marginal portions extended in and secured between the folded margins of the ribbons of packing material.

3. A gasket, as defined by claim 1, of which the connecting medium is cotton tape.

In witness whereof, we have hereunto signed our names.

CECIL R. HUBBARD.
   ROBERT M. WAPLES.